United States Patent

Alvino et al.

[11] 4,214,071
[45] Jul. 22, 1980

[54] AMIDE-IMIDE POLYMERS

[75] Inventors: William M. Alvino, Pittsburgh; Lawrence W. Frost, Murrysville, both of Pa.

[73] Assignee: Westinghouse Electric Corp., Pittsburgh, Pa.

[21] Appl. No.: 567,220

[22] Filed: Apr. 11, 1975

Related U.S. Application Data

[62] Division of Ser. No. 180,190, Sep. 13, 1971, Pat. No. 3,892,768.

[51] Int. Cl.$^2$ ............................................. C08G 73/11
[52] U.S. Cl. ........................................ 528/222; 264/204; 264/205; 428/474; 528/170; 528/179; 528/183; 528/188; 528/189; 528/229; 528/322; 528/336; 528/341
[58] Field of Search ............... 260/65, 47 CP, 78 TF; 204/204, 205; 428/474; 528/170, 179, 183, 188, 189, 222, 229, 322, 336, 341

[56] References Cited

U.S. PATENT DOCUMENTS

| | | | |
|---|---|---|---|
| 3,485,796 | 12/1969 | Naselow | 260/47 |
| 3,554,984 | 1/1971 | George | 260/78 |
| 3,984,375 | 10/1976 | Frost | 260/78 TF |

*Primary Examiner*—Lester L. Lee
*Attorney, Agent, or Firm*—R. D. Fuerle

[57] ABSTRACT

Amide-imide polymers formable in deep section and prepared by the condensation reaction of at least one of a diacid halide or a polyanhydride or equivalent, and a diamine containing at least one imide linkage. Soluble amide-imide polymers having the general formula:

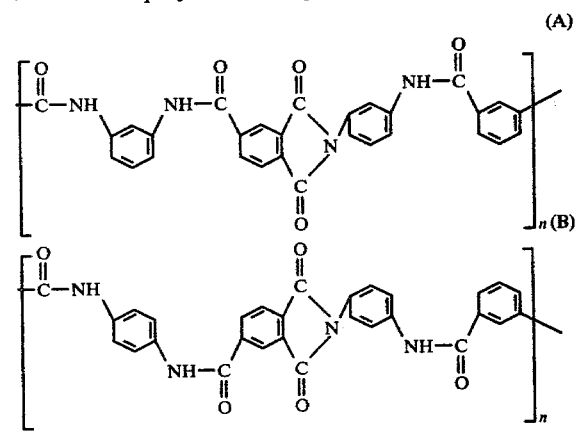

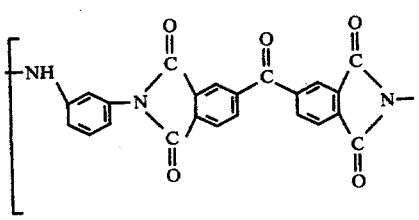

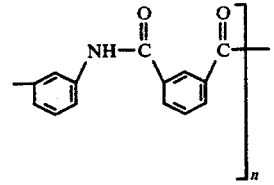

where n is an integer greater than 10 and preferably greater than 20.

A novel amine having the general structural formula:

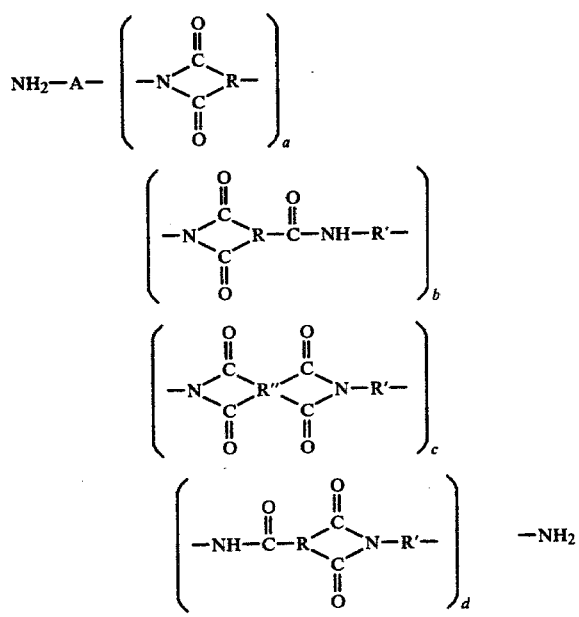

wherein:
A is selected from the group consisting of —R'— and

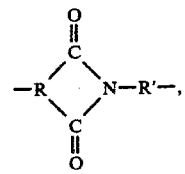

R is a trivalent organic radical in which the two valences included in the imide ring are attached to adjacent carbon atoms and the third valence is attached to a different carbon atom, R' is a divalent organic radical, R" is a tetravalent organic radical in which the bonds are attached to two pairs of adjacent carbon atoms, so that five or six membered imide rings are formed, a, b, c, and d are integers from 0 to 6, the sum of a, b, c, and d is an integer from 1 to 6, at least one R or R" group is included in the molecule, and the bracketed groups are in any order.

Although one or more of the R, R', or R" radicals may contain one or more additional amino groups or other compatible linkages, preferably said amine contains only said terminal amino groups.

20 Claims, No Drawings

AMIDE-IMIDE POLYMERS

This is a division, of application Ser. No. 180,190 filed Sept. 13, 1971, now U.S. Pat. No. 3,892,768.

The present invention relates to novel amide-imide polymers, to novel methods of making amide-imide polymers, and to novel amines which can be used in making imide polymers and amide-imide polymers.

Imide and amide-imide polymers are generally well known in the art. These polymers provide excellent mechanical properties such as high tensile strength and toughness, good dielectric properties, and excellent thermal stability. Because of these properties, the polymers are well suited for use as self-supporting films, electrical insulating coatings, laminating resins and films. Their use, however, has been limited because processing is difficult. They are generally infusible and insoluble except in concentrated acids.

Imide and amide-imide polymers are generally made by reacting a dianhydride and a diamine in a selected solvent to form a polyamic-acid precursor which in turn is cured to the imide or amide-imide polymer. To effect final cure of the conventional polymers, water molecules must be separated out at high temperature. As a result, films can be made without degradation of only a few mils in thickness, usually less than 3 mils. Normally, a thicker film becomes brittle or the polymer precipitates as a powder. Films greater than 3 mils can be made by multiple casting and cure schedules: Films are cast to a thickness of less than 3 mils and cured, and additional layers are cast and cured on the previously formed layer. This method is generally impractical and unsatisfactory because of the multiple cure schedules and the lack of good bonding between the layers.

Conventionally, the polyamic-acid precursor solutions are used in forming the desired shape and for in situ curing. Such polyamic acid solutions generally remain stable for only about one month, after which time gelation or degradation (decrease in viscosity) occurs to a point where the properties of the resulting polymer are impaired or destroyed. While the shelf-life of such solutions can be extended by refrigeration to up to a year, this is not satisfactory, particularly where the solution must be transported to a fabricating facility remote from the point of manufacture. In any event, the solutions must be defrigerated before use.

The present invention provides novel amines and a new method for preparing new amide-imide polymers that overcome these problems and disadvantages. The amide-imide polymers of the present invention can be cast directly into films having thicknesses greater than three (3) mils in one step and without degradation of the final film. The polymers can be molded at lower temperatures and pressures than conventional polyimides, and in some cases remain stable in solution under ordinary conditions for extended periods. The novel amine can also be maintained in stable solutions under normal conditions.

The present invention provides a novel amine containing at least one imide linkage and having at least two terminal amino groups. The amine has the following general structural formula:

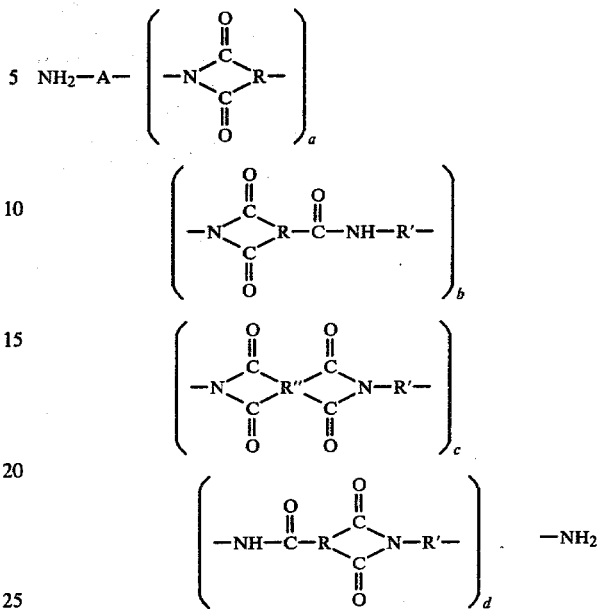

wherein:
A is selected from the group consisting of —R'— and

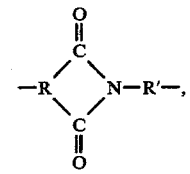

R is a trivalent unsubstituted benzene radical in which the two valences included in the imide ring are attached to adjacent carbon atoms and the third valence is attached to a different carbon atom, R' is selected from the group consisting of divalent radicals of benzene, naphthalene, biphenyl, benzophenone, diphenyl ether, diphenyl sulfone, benzanilide, phenylbenzoate, diphenyl methane and diphenyl propane, R" is selected from the group of radicals provided by the removal of the anhydride groups from dianhydrides selected from the group consisting of 3, 3', 4, 4'-benzophenone tetracarboxylic dianhydride; 1, 2:4, 5-benzenetetracarboxylic dianhydride; bicyclo [2,2,2]-octen-(7)-2,3:5,6-tetracarboxylic dianhydride; 2,3:6,7-naphthalenetetracarboxylic dianhydride; 1,8:4,5-naphthalenetetracarboxylic dianhydride; 3,4:3'4'-biphenyltetracarboxylic dianhydride; 2,3:2',3'-biphenyltetracarboxylic dianhydride; bis(3,4-dicarboxyphenyl) methane dianhydride; 2,2-bis(3,4-dicarboxyphenyl) propane dianhydride; 1,3-bis(3,4-dicarboxyphenyl) propane dianhydride; bis(3,4-dicarboxyphenyl) sulfone dianhydride; bis(3,4-dicarboxyphenyl) ether dianhydride; 1,2:4,5-naphthalenetetracarboxylic dianhydride, 1,1-bis(3,4-dicarboxyphenyl) ethane dianhydride; 2,2-bis(2,3-dicarboxyphenyl) propane dianhydride; 1,2:3,4-cyclopentanetetracarboxylic dianhydride; 1,2:5,6-hexanetetracarboxylic dianhydride; tetrahydrofurane-2,3:4,5-tetracarboxylic dianhydride; 1,1-bis(2,3-dicarboxyphenyl) ethane dianhydride; bis(2,3-dicarboxyphenyl) methane dianhydride; pyrazine-2,3:5,6-tetracarboxylic dianhydride; thiophene-2,3:4,5-tetracarboxylic dianhydride; 1,2:3,4-benzenetetracarboxylic dianhydride (mellophanic dianhydride); and N,N-bis(3,4-dicarboxyphenyl) pyromellitimide dianhydride, a, b, c, and d are integers from 0 to 6, the sum of a, b, c, and d is an integer from 1 to 6, at least one R or R" group is included in the molecule, and the bracketed groups are in any order.

Although one or more of the R, R', or R" radicals may contain one or more additional amino groups or other compatible linkages, preferably said amine contains only said terminal amino groups. At least one of the R radicals may contain one or more compatible linkages as hereinafter described, and/or one or more additional amino groups.

The resulting amino-imide is useful as a monomer in making imide polymers and copolymers. Where polyimide is desired, this is done by reacting a novel amine, containing only imide linkages, with the dianhydrides or with a mixture of the dianhydrides or their equivalents as set forth hereinafter to form a polyamic-acid intermediate, and condensing the intermediate to imidize the polymer. Amide-imide polymers may be made by the same procedure using a novel diamine containing both amine and imide linkages. Preferably, however, amide-imide polymer is made directly by reacting any of the novel amines with a diacid halide as hereinafter described. Where the resulting amine has more than two amino groups, polyfunctionality can result. For this reason, it is preferred that the novel amine contain only the two terminal amino groups (i.e. a diamine).

It is also preferred that aromatic organic compounds be used as monomeric amines. Aromatic compounds, of either the benzenoid or heterocyclic types, generally provide better heat stability than aliphatic or cycloaliphatic compounds. In addition, a monomeric amine should be prepared so that its functional organic groups will not have their effective reactivity rates reduced by their proximity to bulky portions of the monomer molecule or the resulting polymer chain. Otherwise steric hindrance will cause extended reaction times and possibly a serious reduction in the molecular weight of the polymer.

Preferably a novel amine of the present invention is prepared from an aromatic acyl-anhydride, a dianhydride or equivalent, and an aromatic nitro-amine or diamine, wherein at least one of which compounds contains at least one nitro group. The condensation reaction between the amine and anhydride forms a nitro-imide which is reduced to the novel amine-imide of the present invention.

Where an acid halide group or acid group is present in the anhydride compound, the novel amine may also contain an amide linkage. Other compatible linkages may also be incorporated into the novel amine in place of or in addition to the amide linkages. Various vinyl, ester, urethane and ether linkages may occur to those skilled in the art. This variant would however require a selection of starting materials from beyond those hereinafter specifically named. The resulting amine would nonetheless be equivalent and within the scope of the present invention.

Specific amine starting compounds are selected according to the properties desired in the novel amine. Examples of such amine starting compounds are aminonitronaphthalenes, aminonitrobiphenyls, aminonitrobenzophenone, aminonitrodiphenyl ether, aminonitrodiphenyl sulfones, aminonitrobenzanilides, aminonitrophenylbenzoates, aminonitrodiphenyl methanes and aminonitrodiphenyl propanes. Preferably, however, meta- or para-nitroaminobenzene (i.e. m- or p- nitroaniline) is used as the nitroamine starting material. In the foregoing formulae, these starting compounds will provide the divalent R' radicals consisting of the group of divalent radicals of benzene, napthalene, biphenyl, benzophenone, diphenyl ether, diphenyl sulfone, benzanilide, phenylbenzoate, diphenyl methane and diphenyl propane.

In preparing the novel amine where the anhydride compound does not contain nitro groups and the amine compound does contain a nitro group, or where the anhydride contains a nitro group and the amine compound does not contain a nitro group, preferably two moles of the nitro containing compound is reacted with one mole of the other starting compound. Where both the anhydride and the amine starting compounds contain nitro groups, it is preferred that one mole of anhydride compound be reacted with one mole of amine compound. While variations from the stoichiometric amounts are possible, yields will normally be lower and separation difficulties result. Accordingly, it is preferred that the ratios of nitro-amine compounds to anhydride compounds or of nitro-anhydride compounds to amine compounds be as near 2:1 as practical to provide optimum results, and that the ratio of nitro-amine compounds to nitro-anhydride compounds be as near 1:1 as practical to provide optimum results.

Diamines of the present invention containing only imide linkages can be prepared by reacting m- or p-nitroaminobenzene with 3,3', 4,4' benzophenonetetracarboxylic dianhydride (BTDA), or 1,2:4,5-benzenetetracarboxylic dianhydride (PMDA) in a molar ratio of 2:1. Other dianhydrides containing two cyclic anhydride groups may also be similarly used in the present invention. Both five and six membered anhydride rings are useful. Other anhydrides contemplated to be suitable for use in the present invention are: bicyclo [2,2,2]-octen-(7)-2,3:5,6-tetracarboxylic dianhydride, 2,3:6,7-naphthalenetetracarboxylic dianhydride, 1,8:4,5-naphthalenetetracarboxylic dianhydride, 3,4:3',4'-biphenyltetracarboxylic dianhydride, 2,3:2',3'-biphenyltetracarboxylic dianhydride, bis(3,4-dicarboxyphenyl) methane dianhydride, 2,2-bis(3,4-dicarboxyphenyl) propane dianhydride, 1,3-bis(3,4-dicarboxyphenyl) propane dianhydride, bis(3,4-dicarboxyphenyl) sulfone dianhydride, bis(3,4-dicarboxyphenyl) ether dianhydride, 1,2:4,5-naphthalenetetracarboxylic dianhydride, 1,1-bis(3,4-dicarboxyphenyl) ethane dianhydride, 2,2-bis(2,3-dicarboxyphenyl) propane dianhydride, 1,2:3,4-cyclopentanetetracarboxylic dianhydride, 1,2:5,6-hexanetetracarboxylic dianhydride, tetrahydrofurane-2,3:4,5-tetracarboxylic-dianhydride, 1,1-bis(2,3-dicarboxyphenyl) ethane dianhydride, bis(2,3-dicarboxyphenyl) methane dianhydride, pyrazine-2,3:5,6-tetracarboxylic dianhydride, thiophene-2,3:4,5-tetracarboxylic dianhydride, 1,2:3,4-benzenetetracarboxylic dianhydride (mellophanic dianhydride), and N,N-bis(3,4-dicarboxyphenyl) pyromellitimide dianhydride. In the foregoing formulae, these dianhydrides will provide the R" tetravalent radical. As presented in the formulae, the tetravalent radical which remains when both anhydride groups are removed is the R" radical. For convenience of description, the term "tetravalent dianhydride radical" means the tetravalent radical provided when the two anhydride groups are removed. The tetravalent dianhydride radical may also be provided by equivalent compounds, e.g., those described below.

Other equivalent compounds may be substituted in whole or in part for said dianhydride. Especially useful compounds of this class are those containing two ortho-chloro-carbonyl ester groups, or one such group and one anhydride group. Examples are: 2,5-bis (carbomethoxy) terephthaloyl chloride, 4,6-bis(carbobutoxy) isophthaloyl chloride, 4,4'-bis(carboethoxy)-3,3'-benzophenone-bis (carbonyl chloride), 1,4:5,8-naphthalenetetracarboxylic-1,8-anhydride-4-methyl ester-5-acyl chloride, and 2,4-di (carbophenoxy)-1,3-cyclopentane dicarboxylic acid chloride. Other halogens can be substituted for the chlorine in these compounds.

Diamines of the present invention containing both amide and imide linkages may be prepared by reacting m-nitroaniline with 4-chloroformylphthalic anhydride in a molar ratio of 2:1, to produce N-(m-nitrophenyl)-4-(m-nitrocarbanilino) phthalimide which is then reduced to N-(m-aminophenyl)-4-(m-aminocarbanilino) phthalimide:

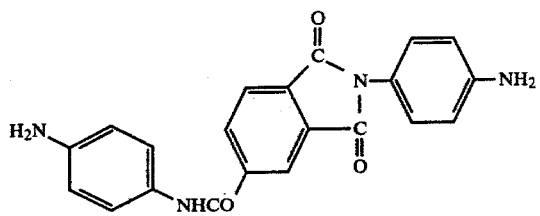

The preparation of diamines of the present invention by use of a nitro anhydride is illustrated by the reaction product of 4-nitrophthalic anhydride and 1,3-diaminobenzene in a molar ratio of 2:1:

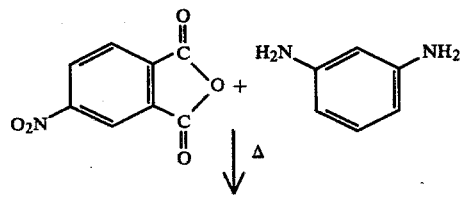

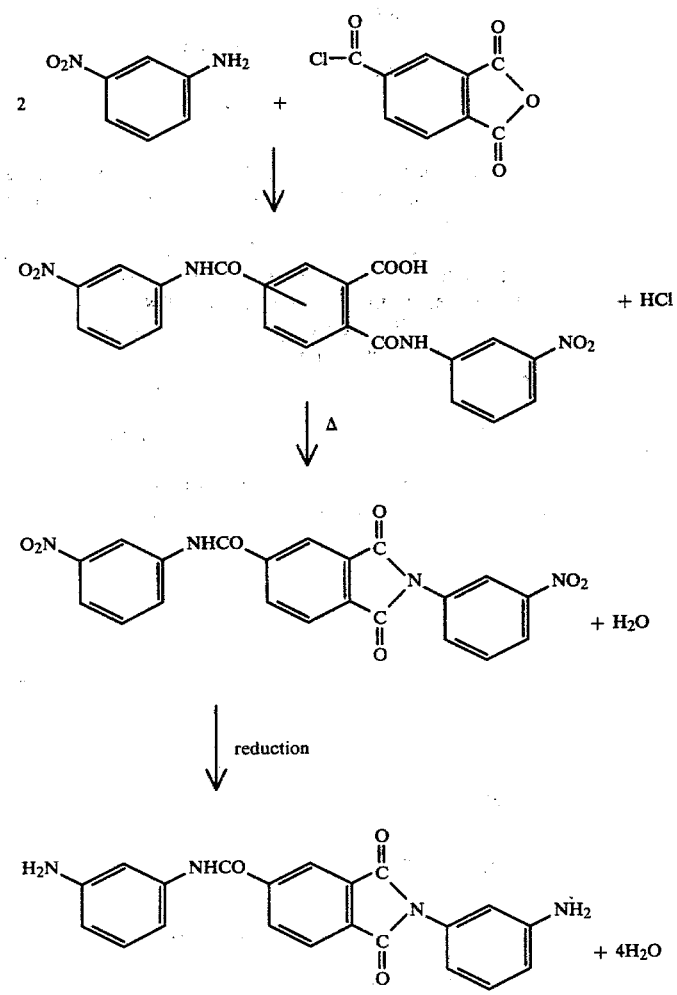

Similarly, N-(p-aminophenyl)-4-(p-aminocarbanilino) phthalimide can be obtained by utilizing p-nitroaniline and 4-chloroformylphthalic anhydride as the starting materials.

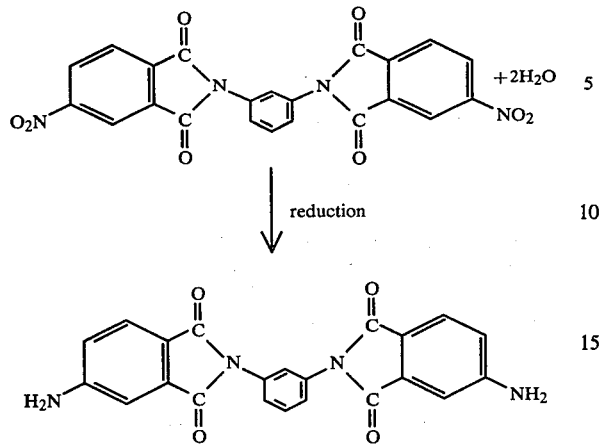

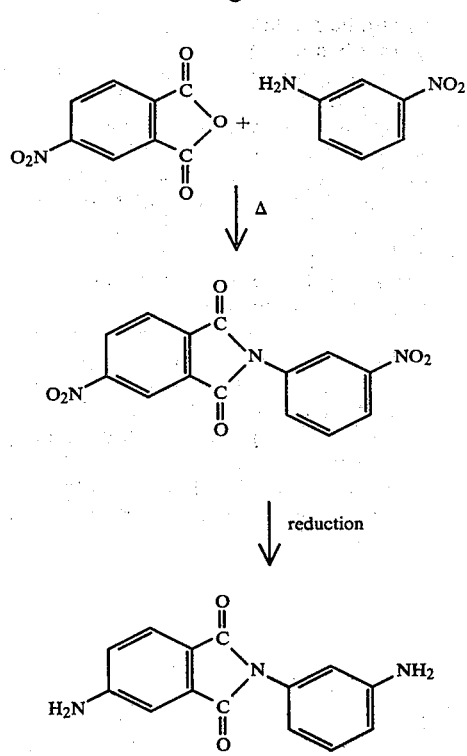

Similarly any other aromatic diamine may be substituted for 1,3 diaminobenzene in this reaction. Other aromatic diamines contemplated to be suitable for this purpose are: 4,4'-diaminodiphenyl ether (DAPE), 4,4'-diaminodiphenylmethane (MDA), 3,4'-diaminobenzanilide (MAB-PPD), 1,4-diaminobenzene, 4,4'-diaminodiphenyl sulfide, 2,2-bis(4-amino-phenyl) propane, 1,4-diaminonaphthalene, 4,4'-diaminobiphenyl, and 3,3'-dichloro- 4,4'-diaminobiphenyl, 4,4'-diaminodiphenyl amine, 4,4'-diaminodiphenyl N-phenyl amine, 3,3'-diaminodiphenyl sulfone, 4,4'-diaminodiphenyl sulfone, 4,4'-diaminodiphenyl diethylsilane and 4,4'-diaminodiphenyl diphenylsilane. These various aromatic diamines can also be used in mixture with each other. These diamines will provide the divalent R' radicals heretofore described in connection with the aminonitro compounds. The 4-chloroformylphthalic anhydride will provide R, the trivalent unsubstituted benzene radical.

Diamines of the present invention may also be prepared by use of nitro anhydrides and nitro amines. Illustrative is the reaction product of 4-nitro phthaic anhydride and m-nitro aminobenzene in a molar ratio of 1:1:

This same diamine may also be prepared by reacting 4-nitrophthatic anhydride with 1,3-diaminobenzene in a molar ratio of 1:1.

As can be seen from these illustrations, a monomeric amine containing any number of imide linkages can be provided depending on the selection of starting materials. However, it is contemplated that a monomeric diamine having greater than six (6) imide linkages cannot be made without starting with a novel amine of the present invention.

Monomeric diamines of the present invention having six (6) imide linkages can be prepared by use of N,N'-bis(3,4-dicarboxyphenyl) pryomellitimide dianhydride and N-(p-amino phenyl)-4-nitrophthalimide in a molar ratio of 1:2:

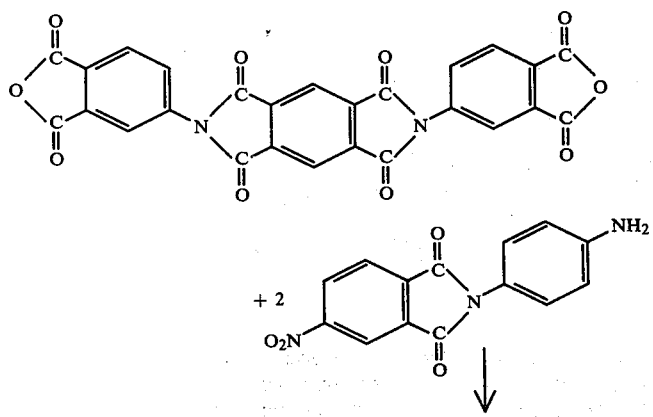

-continued

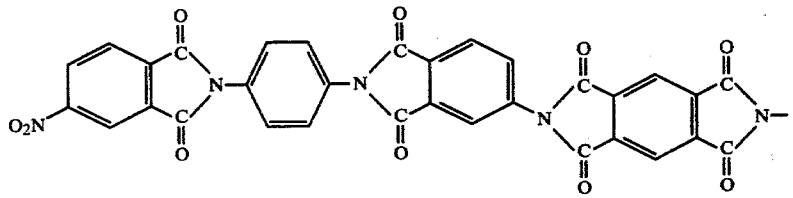

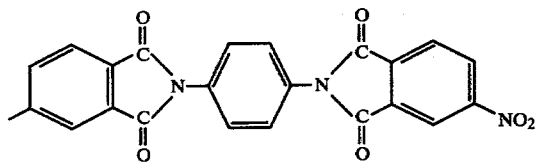

↓ reduction

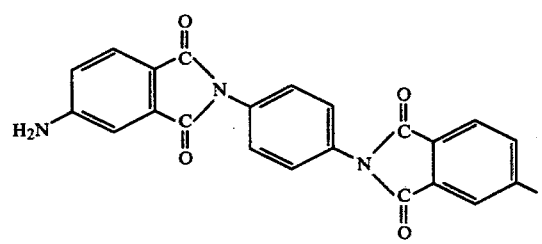

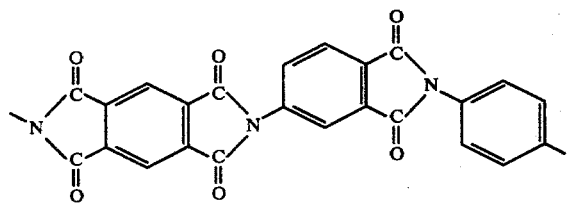

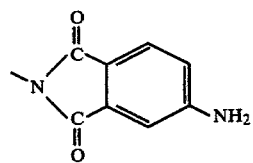

It should be noted that N, N-bis (3,4-dicarboxyphenyl) pyromellitimide dianhydride starting material can be prepared from 4-aminophthalic acid and 1,2,4,5 benzenetetracarboxylic dianhydride in a molar ratio of 2:1; and that the N-(p-amino phenyl)-4 nitrophthalimide starting material can be prepared from 4-nitrophthalic anhydride and 1,4-diaminobenzene in a molar ratio of 1:1.

It can also be seen from this illustration that diamines having up to five (5) amide linkages and one imide linkage can be prepared by selectively substituting acid chloride and/or acid groups for anhydride groups in the above starting materials and their precursors.

The monomeric amine of the present invention can also be prepared in other ways. For example, halogen groups can be used in place of the nitro group and subsequently substituted to form the amine. To illustrate, a diamine containing both imide and amide linkages may be prepared by reacting a 3-halo-aminobenzene with 4-chloroformylphathalic anhydride in a molar ratio of 2:1:

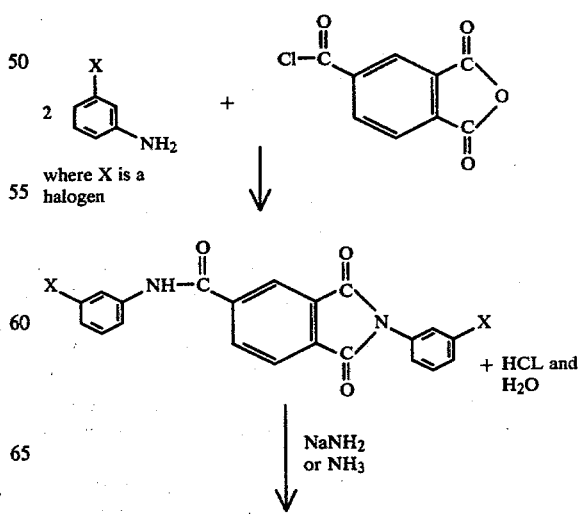

where X is a halogen

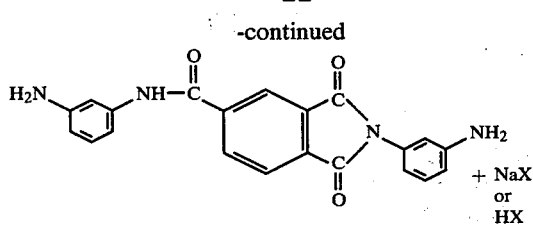

Another example is the use of -NHR groups in place of the nitro groups, where R is an amine protective group, e.g. —Si (CH₃)₃, —COCH₃,

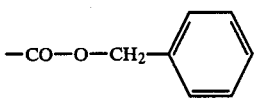

etc., and the subsequent removal of the R group by hydrolysis. To illustrate, a diamine containing both imide and amide linkages can be prepared reacting a unsymmetrical secondary meta-aminobenzene with 4-chloroformylphthalic anhydride:

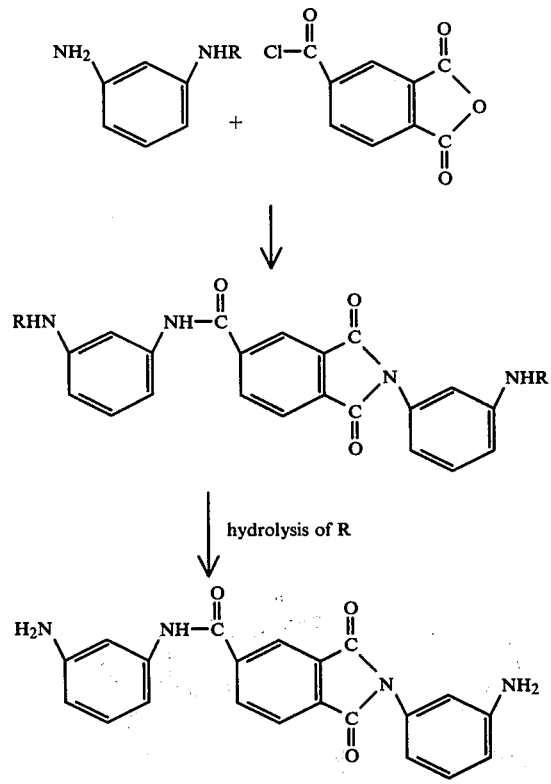

Preferably, R is selected to avoid any possible hydrolysis of imide and amide linkages during hydrolysis and removal of R.

The present invention provides an amide-imide polymer prepared by condensing diamines containing imide linkages with diacid halides and possibly other monomers in the presence of an acid acceptor. The condensation reaction of the present invention avoids the formation of polyamic-acid precursors and the subsequent liberation of water during imidization as required for the conventional production of amide-imide polymers. The resulting polymer is directly castable into films greater than 3 mils in thickness in one step.

Diacid halides suitable for use in the present invention have the structural formula:

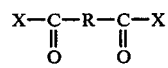

where R is a divalent aliphatic, cycloaliphatic, heterocyclic, or aromatic organic radical, and X is a monovalent halide group. Preferably, R is an aromatic group where high heat stability of the polymer is desired. R can also have unsaturated aliphatic or condensable groups where cross-linking or polyfunctionality is desired. In addition, R should be selected so that the acid halide groups are not sterically hindered to maintain relatively short reaction times and/or to obtain high molecular weight polymer. X is preferably a chloride for convenience in handling the by-product of the condensation reaction, i.e. hydrogen chloride. Both cis and trans diacid halides are suitable.

Other equivalent diacid halides will also occur to those skilled in the art and are within the scope of the present invention. For example, sulfonyl diacid halides, —i.e. where sulfonyl (—SO₂—) groups are present in place of the acyl (—CO—) groups—are useful.

Diacid chlorides particularly desirable for use in the present invention are 1,3-benzene dicarboxylic dichloride (i.e. isophthaloyl chloride), 1,4-benzenedicarboxylic dichloride (i.e. terephthaloyl chloride), 1,8-octane dicarboxylic dichloride (i.e. sebacyl chloride), and 1,4 butane dicarboxylic dichloride (i.e. adipyl chloride). Other diacid chlorides contemplated to be suitable are carbonyl dichloride (i.e. phosgene), bicarbonyl dichloride (oxalyl chloride), malonic acid dichloride (i.e. malonyl chloride), 1,3-propanedicarbonyl dichloride (i.e. glutaryl chloride), 1,5-pentane dicarboxylic dichloride (i.e. pimelyl chloride), 1,6-hexanedicarboxylic dichloride (i.e. suberyl chloride), 1,7-heptanedicarboxylic dichloride (i.e. azelayl chloride), 1,2-benzene dicarboxylic dichloride (i.e. sym-o-phthaloyl chloride), trans-1,2-ethylene dicarboxylic dichloride (i.e. fumaryl chloride), cis-1,2-ethylene dicarboxylic dichloride (i.e. maleyl chloride), bibenzoyl-3,3' (or 4')-dicarboxylic dichloride, bibenzoyl-4,4'-dicarboxylic dichloride, 1,4-cyclohexane-dicarbonyl dichloride, 2,6-pyridinedicarbonyl dichloride, 2,6-pyrazinedicarbonyl dichloride, hexahydroisophthaloyl dichloride, hexahydroterephthaloyl dichloride, 5-chloroisophthaloyl dichloride, 5-tert-butylisophthaloyl dichloride, 2,5-dichloroterephthaloyl dichloride, 2,6-naphthaloyl dichloride, bis(4-chlorocarbonylphenyl) ether, 1,10-bis(3-chlorocarbonylphenoxy)-decane, 2,5-pyridinedicarbonyl dichloride, pyrazine-2,5-dicarbonyl dichloride, 2,5-pyridinedicarbonyl dichloride, 3,5-pyridinedicarbonyl dichloride, 2,5-thiophenedicarbonyl dichloride, ethylene bis (chloroformate), trimethylene bis (chloroformate), 2,2-dimethyltrimethylene bis (chloroformate), cis-1,4-cyclohexylene bis (chloroformate), trans-1,4-cyclohexylene bis (chloroformate), p-phenylene bis (chloroformate), 2,2-bis(4-chlorocarbonyloxphenyl)-propane, 1,1-bis(4-chlorocarbonyloxyphenyl)-cyclohexane, 2,2-bis(4-chlorocarbonyloxy-3,5-dichlorophenyl) propane, 1,2-ethanedisulfonyl dichloride, 1,3-benzenedisulfonyl dichloride, 1,4-benzenedisulfonyl dichloride, 4,5-dichloro-1,3-benzenedisulfonyl dichloride, 4,6-dichloro-1,3-benzenedisulfonyl dichloride, 4,5,6-trichloro-1,3-benzenedisulfonyl dichloride, 4,4-biphenyldisulfonyl dichloride and 2,7-naphthalenedisulfonyl dichloride.

Acid acceptors suitable for use in the present invention are inorganic bases such as metal hydroxides. It is preferred, however, that, in general, weak bases be used to avoid the possibility of opening the ring systems of the polymer. In addition, preferably organic acid acceptors are used because of their compatability with the solvent.

Organic acid acceptors contemplated as appropriate for use are tertiary amines, e.g., triethylamine, tri-n-propylamine, tri-n-butylamine, N-ethylpiperidine, N-allylpiperidine, N-ethylmorpholine, N-methylmorpholine, N,N-diethyl-m-toluidine, N,N-diethyl-p-toluidine, N-allylmorpholine, N,N-diethylaniline, and pyridine. Primary and secondary amines are not deemed desirable.

Organic acid acceptors contemplated to be particularly desirable for use in the present invention are alkylene oxides, e.g., ethylene oxide. The use of propylene oxide has been found to permit the casting of creasable films directly from the reaction mixture as shown by the examples hereinafter. Alkylene oxides are however added to the solution after completion of the condensation reaction to avoid their participation in the reaction.

Solvents suitable for use with the present invention are those heretofore used in making imide polymers. Examples of this selected class of solvents are: N,N-dimethylformamide, N,N-dimethylacetamide, N-methylpyrrolidone, N,N-diethylformamide, N,N-diethylacetamide, N,N-dimethylmethoxyacetamide, N-methylcaprolactam, dimethyl sulfoxide, tetramethyl urea, pyridine, dimethyl sulfone, hexamethylphosphoramide, tetramethylene sulfone, formamide, N-methylformamide, butyrolactone and N-acetyl-2-pyrrolidone. These solvents can also be used in combination with other solvents such as benzene, xylene, toluene, dioxane and cyclohexane, or used in admixture with each other. These solvents provide a solution polymerization medium for the synthesis and for forming the shaped article.

Certain of these solvents may also function as an acid acceptor. An example of such a solvent is N,N-dimethylacetamide (DMAC).

To illustrate the condensation reaction involved, amide-imide polymer is made by reacting the diamine set forth as (B) above with a diacid chloride in a molar ratio of 1:1 utilizing an acid acceptor and solvent:

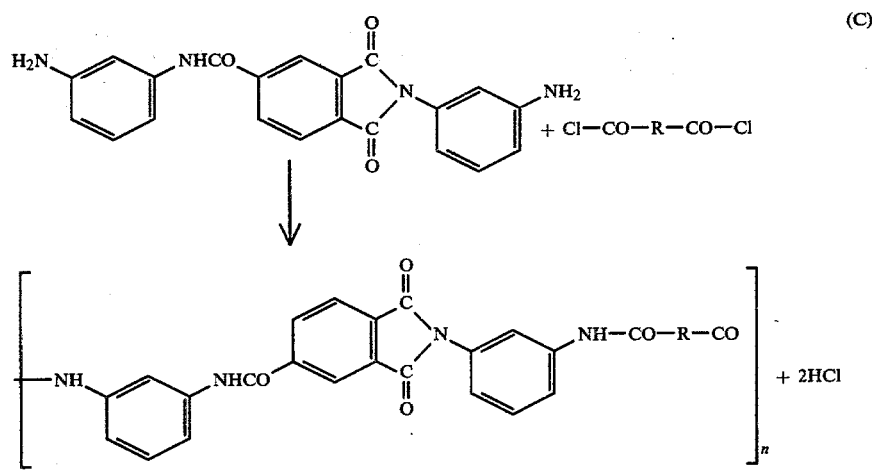

(C)

The amide-imide polymers made by use of the diacid chloride reaction have superior properties over amide-imide polymers made by use of polyamic-acid precursors, notwithstanding that the structural formulas in some instances are identical. The polymer can be cast directly into films of more than 3 mils in thickness in one step. As previously noted, amide-imide films previously made using a polyamic acid precursor required the liberation of volatile byproducts during the final cure which caused degradation when one attempted to cast films of greater than 3 mils with one cure schedule. By means of the present invention films greater than 3 mils can be cast simply by driving off the solvent and in some cases the acid acceptor.

Various linkages other than imide linkages can be incorporated into the polymer chains by using diamines and/or dianhydrides containing the desired linkage. In addition, physical blends can be prepared by mixing other difunctional and polyfunctional compounds containing the desired linkage or precursors thereof into the polyamide-acid solution. Various suitable vinyl compounds, polyols, polyacids, polyamides, polyesters, polyurethanes, epoxies and the like are useful. However, it is understood that not all compounds within these broad classes are totally compatible. Also, inclusion of some of these compounds may compromise properties of the amide-imide for other properties. For example, inclusions of certain linkages may drastically change the solubility of the polymer.

Suprisingly and unexpectedly it has also been found that certain amide-imide polymers made by use of the present invention are not only soluble in the selected solvents but stable in said solvents over long periods of time. Said soluble amide-imide polymers are as follows:

(1) The reaction product of N-(p-amino-phenyl)-4-(p-aminocarbanilino) phathalimide and isophthaloyl chloride and having the following structural formula:

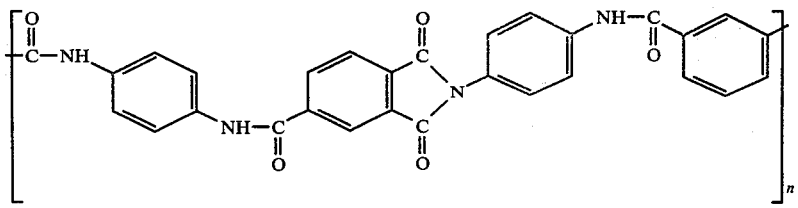

where n is an integer greater than 10 and preferably greater than 20.

(2) The reaction product of N-(m-amino-phenyl)-4-(m-aminocarbanilino) phthalimide and isophthaloyl chloride and having the following structural formula:

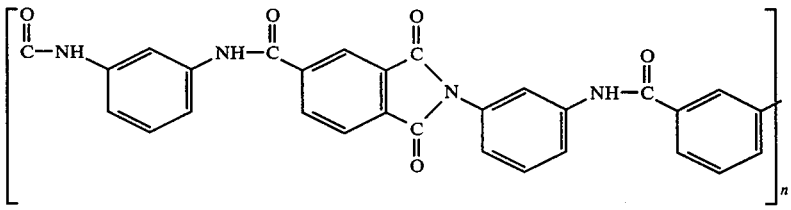

where n is an integer greater than 10 and preferably greater than 20.

To illustrate, a solution of this polymer was made on Aug. 15, 1969, and its Gardner viscosity found to be Y. The sample was maintained on the laboratory shelf and its Gardner viscosity again measured on June 11, 1971. Its Gardner viscosity was found to be the same as it was on Aug. 15, 1969 (i.e. Y).

(3) The reaction product of the diamine formed from m-nitroaniline and 3,3',4,4'-benzophenonetetracarboxylic dianhydride as hereinbefore described and isophthaloyl chloride and having the following structural formula:

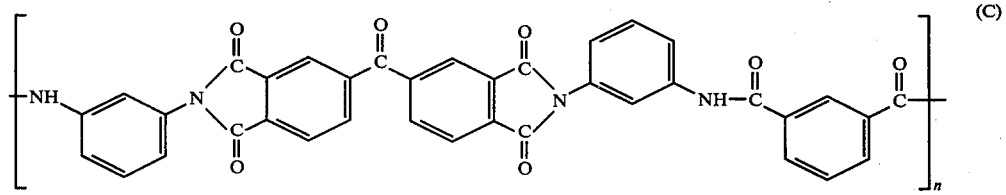

(C)

Other details, objects and advantages of the invention will be apparent as the following non-limiting examples illustrate it:

EXAMPLE I

Preparation of N-(m-aminophenyl)-4-(m-aminocarbanilino) phthalimide

A solution of 138 grams (1.0 mole) m-nitroaniline in 500 ml. N,N-dimethylacetamide (DMAC) was stirred while a solution of 105 grams (0.5 mole) of 4-chloroformyl phthalic anhydride (TMAC) in 250 ml. of xylene was added. The resulting mixture was stirred and heated to reflux, and the liberated water collected in a continuous decanting device. After approximately 1.5 hours of reflux, 11 ml. of aqueous layer had been collected and water evolution had ceased. The mixture was cooled to room temperature and a white precipitate formed which was filtered, washed and dried to give 215 grams of product (A). The product was hydrogenated at about 100° C. at 55 psi using a Parr shaker, 5% Pd-on-C catalyst and DMAC as a solvent (approximately 1400 ml. total). The hydrogenated product was filtered to remove the catalyst and the filtrate was then passed through a column of adsorption alumina. The effluent was poured into 4 liters of water to give a precipitate that was dried to give 100 grams (54% yield) of diamine with a melting point of 242° C.

Analysis

Calculated for $C_{21}H_{16}N_4O_3$: C=67.7; H=4.33; N=15.05; O=12.90.

Found: C=67.03, 66.88; H=4.50, 4.32; N=15.13, 15.04; O=13.32.

EXAMPLE II

Preparation of N-(p-aminophenyl)-4-(p-aminocarbanilino) phthalimide

The same procedure was followed as in Example I using p-nitroaniline in place of m-nitroaniline. A brown powder product was obtained having a melting point of 293° C.

Calculated for $C_{21}H_{16}N_4O_3$: C=67.74; H=4.33; N=15.05; O=12.90.

Found: C=66.60; H=4.36; N=14.62; O=14.73.

EXAMPLE III

N,N'-bis(m-aminophenyl) benzophenonetetracarboxylic acid diimide

To a stirred solution of 16.5 grams (0.12 mole) m-nitroaniline in 205 ml. DMAC was added 19.3 grams (0.06 mole) BTDA. The resulting mixture was heated to 100° C. over a ½ hour period, cooled to room temperature, and mixed with 100 ml. of acetic anhydride. The reaction mixture was heated to 80° C. for 5 minutes, cooled to room temperature, and mixed with 70 ml. of benzene. A white precipitate of N,N'-bis(m-nitrophenyl) benzophenonetetracarboxylic acid diimide formed, which was filtered, washed and dried, having a melting point of 332° C.

Analysis

Calculated for $C_{29}H_{14}N_4O_9$: C=61.94; H=2.49; N=9.95; O=25.61.

Found: C=61.83; H=2.50; N=9.82; O=25.65.

N,N'-bis(m-aminophenyl) benzophenonetetracarboxylic acid diimide was obtained by the catalytic hydrogenation of 5.62 grams (0.01 mole) of the product obtained above in a Parr shaker, using 1 gram of 5% Pd/C as catalyst in 150 ml. DMAC. Reduction was carried out at 50 psig and 84° C. The solution was filtered and passed through an alumina column. The clear green filtrate was poured into water. A precipitate formed, which was filtered off, washed and dried to give a pale yellow powder, m.p. 265° C.

Analysis

Calculated for $C_{29}H_{18}N_4O_5$: C=69.67; H=3.38; N=11.18; O=15.97.

Found: C=68.96; H=4.29; N=11.20; O=15.56.

EXAMPLE IV

N,N'-bis(m-aminophenyl) pyromellitimide

To a stirred solution of 27.6 grams (0.20 mole) m-nitroaniline in 320 ml. DMAC was added 21.8 grams (0.10 mole) PMDA. A precipitate separated in about one minute. The mixture was heated to 108° C. over 40 minutes, during which time the precipitate changed from tan to lustrous yellow. The mixture was cooled to room temperature and filtered. The solid product was washed with benzene and dried to give yellow crystals of N,N'-bis(m-nitrophenyl) pyromellitimide having a melting point of 388° C.

Analysis

Calculated for $C_{22}H_{10}N_4O_8$: C=57.64; H=2.18; N=12.22; O=28.00.

Found: C=57.8; H=2.24; N=12.13; O=28.11.

N,N'-bis(m-aminophenyl) pyromellitimide was prepared by hydrogenation of 4.5 grams (0.01 mole) of the above product in 150 ml. DMAC in a Parr shaker at 50 psig and 100° C., using 0.8 gram of 5% Pd/C. The solution was filtered and passed through an alumina column. The clear green filtrate was poured into water and a pale yellow solid separated, which turned dark brown upon drying in air. DTA gave a broad endotherm beginning at 340° C.

Analysis

Calculated for $C_{22}H_{14}N_4O_4$: C=66.40; H=3.51; N=14.08; O=16.08.

Found: C=64.98; H=4.55; N=13.12; O=16.83.

Preparation of Polymers

EXAMPLE V 3.72 grams (0.01 mole) of the diamine prepared in Example I was dissolved in 20 cc dimethylacetamide (DMAC) and 1.58 grams (0.02 mole) pyridine. To this solution was added 2.02 grams (0.01 mole) isophthaloyl chloride (IPC). The temperature of this exothermic reaction was maintained at about 25°–49° C. by means of an ice-water bath. As the reaction proceeded the resin solution became extremely viscous and 16 ml. of DMAC was added. The resin solution reached a maximum viscosity in about 5–10 minutes and films were cast from this solution and cured to 150° C. The films were clear light amber and brittle. The resin solution was further diluted with DMAC to give a syrup consistency and poured into distilled water and stirred to precipitate the polymer. The fibrous polymer was filtered and washed with water until a negative silver nitrate test was obtained. The polymer was redissolved in DMAC to give a 19% solution having a Gardner viscosity of Z1+(inherent viscosity=1.09 dl/g), which remained unchanged after a month at room temperature. Films cast from this solution cured to 150° C. were light amber in color and creasable. Films thicknesses were achieved from 1 mil. to 14 mils.

Folding endurance under a 1 kg. load was 150 cycles for a 3.4 to 3.7 mil film. Folding endurance was 2630 cycles for a 1.3 mil film.

Aging of the films at 300° C. in metal frames did not produce brittleness after 200 hours.

EXAMPLE VI

The polymer prepared in Example V was also prepared using propylene oxide as the acid acceptor. To 14.88 grams (0.04 mole) of the diamine dissolved in 125 ml. of DMAC was added 8.08 grams (0.04 mole) of isophthaloyl chloride. The temperature of the exothermic reaction was maintained between 18° and 28° C. The viscosity of the mixture increased and reached a maximum in about 20 minutes. At this point 4.64 grams (0.08 mole) of propylene oxide was added. An exothermic reaction was noted and the mixture was stirred for about 15 minutes. Creasable films could be cast from the reaction mixture.

EXAMPLE VII 3.72 grams (0.01 mole) of the diamine prepared in Example I was dissolved in 20 cc DMAC and 1.58 grams (0.02 mole) pyridine. To this solution was added 2.38 grams (0.01 mole) sebacyl chloride. The reaction was similar to that in Example V. Brittle films were obtained from the as-prepared solution. The polymer was then precipitated as in Example V and redissolved in DMAC to give a 16% solution with a Gardner viscosity of X (inherent viscosity of 1.13 dl/g). Films were cast and cured as in Example III and found to be creasable.

EXAMPLE VIII 11.16 grams (0.03 mole) of the diamine prepared in Example I was dissolved in 72 cc DMAC and 4.74 grams (0.06 mole) pyridine. To this solution was added 6.06 grams (0.03 mol) of IPC while cooling the reaction with an ice-water bath. Additional DMAC was needed along with vigorous stirring to prevent gelation. The reaction proceeded to maximum viscosity in a few minutes. The polymer was precipitated into distilled water and washed until a negative silver nitrate test was obtained. The filtered and dried fibrous polymer (15 g) was redissolved in DMAC-toluene mixture (50:50) and film cast at 275° C. Blistering was a problem at this temperature with very thick films. However, tough creasable films of moderate thickness were obtained. The mechanical properties of a 1 mil film include: tensile strength 18,670 psi; tensile modulus $0.63\times10^6$ psi; and an elongation of 5.3%.

EXAMPLE IX 5.5 grams of the light tan polymer prepared in Example VIII was charged into a 0.5" diameter cylindrical mold. The mold assembly was heated by means of a band heater under contact pressure (500–1,000 lbs.) at 270° C. This pressure was increased to about 3 tons and the polymer began melting as indicated by a large pressure drop. As the temperature rose to 295° C. the pressure was increased to 8 tons. Thereafter the pressure was decreased to 5 tons and held for 10 minutes at a temperature between 270° and 280° C. A translucent brittle part was obtained.

EXAMPLE X 6 grams of the polymer powder prepared in Example VIII was introduced into a 1½" diameter cylindrical mold and heated without pressure to 300° C. and held at this temperature for approximately 30 minutes. The mold assembly was disconnected from the heater and placed in a cold press and 30 tons pressure applied for 15 minutes while cooling the mold with compressed air. A molded disc of ⅛" thickness was obtained which was translucent, dark amber in color. A cross section view of the materials show the polymer to have completely melted and strongly fused together to give a glass-like appearance.

EXAMPLE XI

A solution of the polymer prepared in Example V was prepared by dissolving that polymer in a mixture of DMAC and toluene. The resulting solution contained 9.7% solids, 53.2% DMAC and 37.1% toluene. This solution was applied to both surfaces of Kapton$^R$ film, and cured to 250° C. The dry film thickness was 0.0002". The films were then laminated together in a press at 275° C. and 250 psi for 15 minutes. The films adhered strongly to each other so that the film tore when attempts were made to peel them apart. No blisters were noticed in the adhesive layer, which was clear and smooth.

EXAMPLES XII–XV

Diamines from Examples II–IV were condensed with isophthaloyl chloride following the method of Example VI to prepare polymers XII–XIV. Polymer XV was prepared by condensing the diamine of Example I with sebacyl chloride in the manner described in Example VI.

Polymer XII

Analysis

Calculated: C=69.32; H=3.59; N=11.15; O=15.96.
Found: C=67.54; H=3.70; N=10.44; O=18.07.

Polymer XIII

Analysis

Calculated: C=70.03; H=3.16; N=8.86; O=17.71.
Found: C=68.76; H=3.52; N=8.62; O=17.24.

Polymer XIV

Analysis

Calculated: C=68.18; H=3.03; N=10.62; O=18.19.
Found: C=63.93; H=3.45; N=8.55; O=23.20.

Polymer XV

Analysis

Calculated: C=69.14; H=5.58; N=10.41; O=14.88.
Found: C=67.67; H=5.51; N=10.32; O=15.09.

Film Properties

| Designation | Tensile Strength, psi | % Elongation | Tensile Modulus, psi | Color |
|---|---|---|---|---|
| Polymer XII | 10,450 | 2.2 | $0.62 \times 10^6$ | Red-amber |
| Polymer XIII | 13,600 | 4.1 | $0.5 \times 10^6$ | Light brown |
| Polymer XV | 8,080 | 2.4 | $0.41 \times 10^6$ | Amber |

What is claimed is:

1. A method of preparing an amide-imide polymer without liberation of water after polymerization, comprising:
   (1) preparing a dinitro imide intermediate by reacting a first compound selected from the group consisting of nitroamine, diamine, or mixture thereof, with a second compound selected from the group consisting of dianhydride, nitroanhydride, acyl-anhydride, anhydride equivalent, or mixtures thereof, where said first and second compounds are selected to provide the two nitro groups in said dinitro imide;
   (2) reducing the two nitro groups in said dinitro imide intermediate to amino groups to form a diamino imide intermediate; and
   (3) reacting said diamino imide intermediate with at least one diacid halide to produce said amide-imide polymer.

2. A method according to claim 1 wherein said first compound is a nitroamine selected from the group consisting of m-nitroaminobenzene, p-nitroaminobenzene, and mixtures thereof, and said second compound is an anhydride selected from the group consisting of 4-chloroformyl phthalic anhydride, 3,3',4,4'-benzophenonetetracarboxylic dianhydride, 1,2,4,5-benzenetetracarboxylic dianhydride, and mixtures thereof.

3. A method according to claim 1 wherein said first compound is m-nitroaniline and said second compound is 3,4,3',4'-benzophenonetetracarboxylic dianhydride.

4. A method according to claim 1 wherein said first compound is p-nitroaniline and said second compound is 3,4,3',4'-benzophenonetetracarboxylic dianhydride.

5. A method according to claim 1 wherein said first compound is m-nitroaniline and said second compound is pyromellitic dianhydride.

6. A method according to claim 1 wherein said first compound is p-nitroaniline and said second compound is pyromellitic dianhydride.

7. A method according to claim 1 wherein said first compound is m-nitroaniline and said second compound is 4-chloroformylphthalic anhydride.

8. A method according to claim 1 wherein said first compound is p-nitroaniline and said second compound is 4-chloroformylphthalic anhydride.

9. A method according to claim 1 wherein the nitro group in said nitroamine is other than ortho to the amine group in said nitroamine.

10. A method according to claim 1 wherein the molar ratio of said first compound to said second compound is 1:1 when both said first and said second compounds are monofunctional, 2:1 when said second compound is difunctional and said first compound is monofunctional, and 1:2 when said first compound is difunctional and said second compound is monofunctional.

11. A method according to claim 1 wherein said diamino imide intermediate is reacted with said diacid halide in the presence of a third compound selected from the group consisting of acid acceptors, solvents, or mixtures thereof, said third compound being removed after reaction with heat.

12. A method according to claim 1 wherein said first compound is aromatic.

13. A method according to claim 12 wherein said diacid halide is aromatic.

14. A method according to claim 1 wherein said polymer contains at least 10 repeating units.

15. A method according to claim 1 wherein the molar ratio of said diamino imide intermediate to said diacid halide is 1:1.

16. A method according to claim 1 wherein said diacid halide is isophthaloyl chloride.

17. A method according to claim 1 wherein said diacid halide is terephthaloyl chloride.

18. A method according to claim 1 wherein said diacid halide is sebacyl chloride.

19. A method according to claim 1 wherein said polymer is in solution and said solution is applied to a substrate and the solvent in said solution is evaporated, thereby forming a film.

20. A method according to claim 19 wherein said film forms an electrically insulating coating.

* * * * *